US009258126B2

United States Patent
Manchala

(10) Patent No.: US 9,258,126 B2
(45) Date of Patent: Feb. 9, 2016

(54) METHOD FOR NON-REPUDIATION OF AD-HOC WORKFLOWS

(71) Applicant: Xerox Corporation, Norwalk, CT (US)

(72) Inventor: Daniel W. Manchala, Torrance, CA (US)

(73) Assignee: XEROX CORPORATION, Norwalk, CT (US)

( * ) Notice: Subject to any disclaimer, the term of this patent is extended or adjusted under 35 U.S.C. 154(b) by 33 days.

(21) Appl. No.: 13/713,187

(22) Filed: Dec. 13, 2012

(65) Prior Publication Data

US 2014/0173285 A1    Jun. 19, 2014

(51) Int. Cl.
*H04L 9/32*      (2006.01)
*G06Q 10/10*      (2012.01)

(52) U.S. Cl.
CPC ............ *H04L 9/3247* (2013.01); *G06Q 10/107* (2013.01)

(58) Field of Classification Search
CPC ........................... H04L 9/0643; H04L 9/3223
USPC .................................................. 713/176–180
See application file for complete search history.

(56) References Cited

U.S. PATENT DOCUMENTS

| | | | | |
|---|---|---|---|---|
| 2002/0073074 A1* | 6/2002 | Sweet | ..................... | G06F 17/21 |
| 2002/0091928 A1* | 7/2002 | Bouchard | ............. | H04L 9/3247 713/178 |
| 2004/0019788 A1* | 1/2004 | Miyazaki | .............. | H04L 9/3236 713/169 |
| 2005/0086188 A1* | 4/2005 | Hillis | ...................... | G06N 5/022 706/50 |
| 2007/0247656 A1 | 10/2007 | Manchala et al. | | |
| 2009/0265762 A1 | 10/2009 | Evanitsky | | |
| 2010/0088239 A1 | 4/2010 | Blair et al. | | |
| 2010/0115610 A1 | 5/2010 | Tredoux et al. | | |
| 2010/0153580 A1 | 6/2010 | Tredoux et al. | | |
| 2010/0174650 A1* | 7/2010 | Nonaka | ................ | G06Q 20/045 705/44 |
| 2010/0180345 A1 | 7/2010 | Manchala et al. | | |
| 2010/0191602 A1 | 7/2010 | Mikkelsen et al. | | |
| 2010/0251374 A1 | 9/2010 | Dill et al. | | |
| 2011/0061092 A1* | 3/2011 | Bailloeul | ................ | G06F 3/002 726/4 |
| 2011/0078152 A1* | 3/2011 | Forman | ................. | G06F 17/277 707/747 |
| 2011/0185188 A1* | 7/2011 | Spalka | ................ | G06F 21/6254 713/189 |
| 2011/0304890 A1 | 12/2011 | Martin et al. | | |
| 2012/0330887 A1* | 12/2012 | Young | ............... | G06F 17/30206 707/610 |

OTHER PUBLICATIONS

Meadors, Kyle, "Secure electronic data interchange over the Internet," Internet Computing, IEEE Year: 2005, vol. 9, Issue: 3 pp. 82-89.*
Russell, Selwyn "Paradigms for verification of authorization at source of electronic documents in an integrated environment," Computer Security Applications Conference, 1992. Proceedings., Eighth Annual Year: 1992 pp. 203-209.*

* cited by examiner

*Primary Examiner* — Roderick Tolentino
(74) *Attorney, Agent, or Firm* — Fay Sharpe LLP

(57) ABSTRACT

Described herein is a technique in which the proof that an object (e.g., a document) was processed within a certain task by an entity in a workflow is chain-linked to another proof of the next task. The chain of proofs embedded within the document serves to irrefutably prove that a certain set of tasks were completed before the next task was executed on the object. It is thus difficult, if not impossible, for a user to alter the actions on previous tasks without destroying the chain of proofs.

14 Claims, 4 Drawing Sheets

METHOD FOR NON-REPUDIATION OF AD-HOC WORKFLOWS

BACKGROUND

The embodiments disclosed herein relate to a method and system for providing a non-repudiable proof that a certain set of tasks were completed before an entity (user or system) could perform the next task in the workflow. While the exemplary embodiment is particularly directed to the art of electronic document processing and will be thus described with specific reference thereto, it will be appreciated that the exemplary embodiment may have usefulness in other fields and applications.

By way of background, a workflow represents a flow of work. In a business, for example, suppose that one of the members of the business is going to purchase an article. First, the person prepares a purchase slip and then that person brings the purchase slip to the superior. The superior checks the purchase slip, stamps the approval, and sends the purchase slip to the accounting department. Based on the purchase slip, the accounting department orders the article. Thus, the purchase slip flows from the originating person to the superior, and then from the superior to the accounting department, thus advancing the workflow. Therefore, a workflow can be considered a sequence of tasks. A task can be further divided into sub-tasks. Tasks can be performed by persons as in the foregoing example, and can automatically be performed by computers as, for example, in a printing job.

In an ad-hoc workflow, however, there is no pre-defined workflow model for the business process. That is, the business process is built ad-hocly as it is enacted using distributed services (activities). For instance, in the health care environment a new or existing patient may go to the doctor's office for treatment of an ailment. If it is a new patient, medical records are generated. The patient may undergo one or more medical tests, and in that case the patient's medical records, including various documents, are updated. Typically, the physician will then review the patient's medical records (and test results) and make a diagnosis. Once again, the patient's medical records, including at least some of the various documents, are updated (or deleted), this time by the physician and/or a nurse. In some instances, the patient may be referred to one or more surgeons for further testing and/or medical procedures. In this scenario, various medical personnel are reviewing and updating the patient's medical records, including receptionists, nurses, physicians, testing department, surgeons, etc. During this process new documents may be added, at least some of the documents may be modified, and at least some of the documents may be deleted.

Previous developments depended upon an audit log stored on a central server that was used to determine if a certain set of tasks were performed. Not only are the audit logs subject to hacker attacks, but they could not be used in ad-hoc workflows that span different organizations, each having its own network or domain servers.

Therefore, there is a need to provide a non-repudiable proof that a certain set of tasks were completed before an entity (user or system) could perform the next task in the workflow. Otherwise a user (e.g., an employee) could alter one or more of their actions relating to previous tasks and pretend that the previous set of actions had never taken place or had taken place in a different manner.

BRIEF DESCRIPTION

Described herein is a technique wherein the proof that an object (e.g., a document) was processed within a certain task by an entity in a workflow is chain-linked to another proof of the next task. The chain of proofs embedded within the document serves to irrefutably prove that a certain set of tasks were completed before the next task was executed on the object. It is thus difficult, if not impossible, for a user to alter the actions on previous tasks without destroying the chain of proofs.

In one embodiment, a method of providing non-repudiation of documents in ad-hoc workflows is described. The method includes combining a message digest of a document before one or more actions are performed on the document or a set of documents such as a document set that comprises one or more documents with a message digest of the document after one or more actions have been performed on the document repetitively until a last action has been performed on the document or document set to generate a resulting quantity; and digitally signing the resulting quantity with a first private key from a user and a second private key from a workflow system.

In another embodiment, a system for providing non-repudiation of documents in ad-hoc workflows is described. The system includes one or more processors operative to: combine a message digest of a document before one or more actions are performed on the document or a set of documents such as a document set that comprises one or more documents with a message digest of the document after one or more actions have been performed on the document repetitively until a last action has been performed on the document or document set to generate a resulting quantity; and digitally sign the resulting quantity with a first private key from a user and a second private key from a workflow system In yet another embodiment, a non-transitory computer-usable data carrier storing instructions that, when executed by a computer, cause the computer to perform a method of providing non-repudiation of documents in ad-hoc workflows is described. The method includes combining a message digest of a document before one or more actions are performed on the document or a set of documents such as a document set that comprises one or more documents with a message digest of the document or the document set after one or more actions have been performed on the document repetitively until a last action has been performed on the document or the document set to generate a resulting quantity; and digitally signing the resulting quantity with a first private key from a user and a second private key from a workflow system.

In yet another embodiment, a method of providing non-repudiation of documents in ad-hoc workflows is provided. The method includes: generating an initial chained value for a first task for a first document in a set of documents, wherein the initial chained value comprises a random number; calculating a message digest or hash of the first document; calculating a chained value for the first task using the initial chained value and the hash of the first document; and storing the chained value for the first task in the audit log.

DETAILED DESCRIPTION

As used herein, a networked device is a device that is connected in a network typically to one or more computer users to provide certain functionality to the computer users. Examples of networked devices are a printer, a scanner, a copier, a facsimile device, a device combining the functionality of any of these devices (often referred to as a multifunction device (MFD)), and the like.

Figure 1:
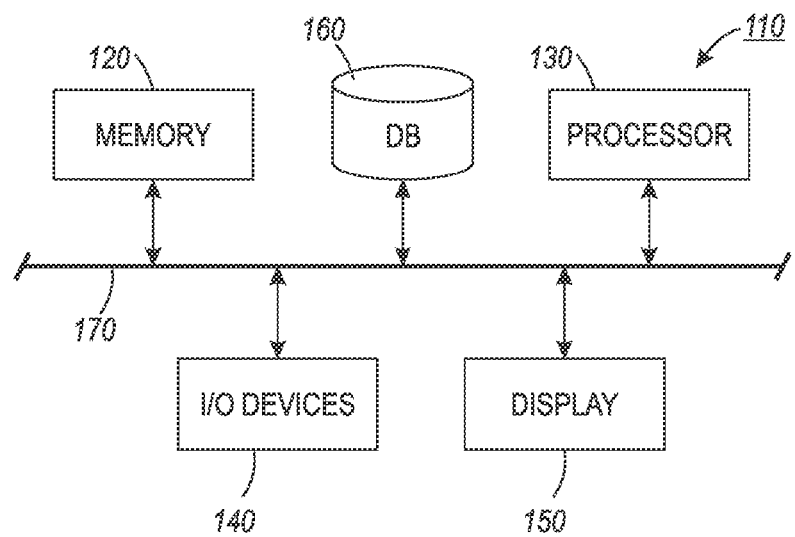
FIG. 1 is a block diagram of an apparatus suitable for implementing aspects of the exemplary embodiments.

FIG. 1 illustrates a diagram of a system or apparatus 110 suitable for implementing the exemplary embodiments. The system 110 may be embodied within devices such as a desktop computer, a laptop computer, a handheld computer, a handheld communication device, or another type of computing or electronic device, or the like. The system 110 may include a memory 120, a processor 130, input/output devices 140, a display 150, a database 160, and a bus 170. The bus 170 may permit communication and transfer of signals among the components of the computing device 110. It is noted that the display 150 and input/output devices 140 may not be needed in certain embodiments.

The processor 130 may include at least one conventional processor or microprocessor that interprets and executes instructions. The processor 130 may be a general purpose processor or a special purpose integrated circuit, such as an ASIC, and may include more than one processor section. Additionally, the system 110 may include a plurality of processors 130.

The memory 120 may be a random access memory (RAM) or another type of dynamic storage device that stores information and instructions for execution by processor 130. Memory 120 may also include a read-only memory (ROM), which may include a conventional ROM device or another type of static storage device that stores static information and instructions for the processor 130. The memory 120 may be any memory device that stores data for use by the system 110.

The input/output devices 140 (I/O devices) may include one or more conventional input mechanisms that permit a user to input information to the system 110, such as a microphone, touchpad, keypad, keyboard, mouse, pen, stylus, voice recognition device, buttons, and the like, and output mechanisms, such as one or more conventional mechanisms that output information to the user, including a display, one or more speakers, a storage medium, such as a memory, magnetic or optical disk, disk drive, a printer device, and the like, and/or interfaces for the above. The display 150 may typically be an LCD or CRT display as used on many conventional computing devices, or any other type of display device.

The system 110 may perform functions in response to the processor 130 by executing sequences of instructions or instruction sets contained in a computer-readable medium, such as, for example, the memory 120. Such instructions may be read into the memory 120 from another computer-readable medium, such as a storage device, or from a separate device via a communication interface, or may be downloaded from an external source such as the Internet. The system 110 may be a stand-alone system, such as a personal computer, or may be connected to a network such as an intranet, the Internet, and the like. Other elements may be included with the system 110 as needed.

The memory 120 may store instructions that may be executed by the processor to perform various functions. For example, the memory may store printer driver or other instructions to allow the system to perform various printing functions in association with a particular printer connected to the system. The printer driver instructions are typically unique to each specific type of printer, and the system 110 may store a plurality of print drivers each for a different printer. Instructions for drivers for networked devices other than printers may also be used. Employees in a company, medical office, or other organization may utilize one or more of the systems 110 described above.

Figure 2:
FIG. 2 shows an example of a linear ad-hoc workflow with a plurality of tasks.

Ad-hoc workflows may form when workflows are automatically re-created due to equipment failures, organization changes or disruptions, employee substitutions, or for other reasons. FIG. 2 shows an example of a linear ad-hoc workflow with a number (n) of tasks, such as Task 1, Task 2, Task 3, Task (n−1), and Task n.

Figure 3:
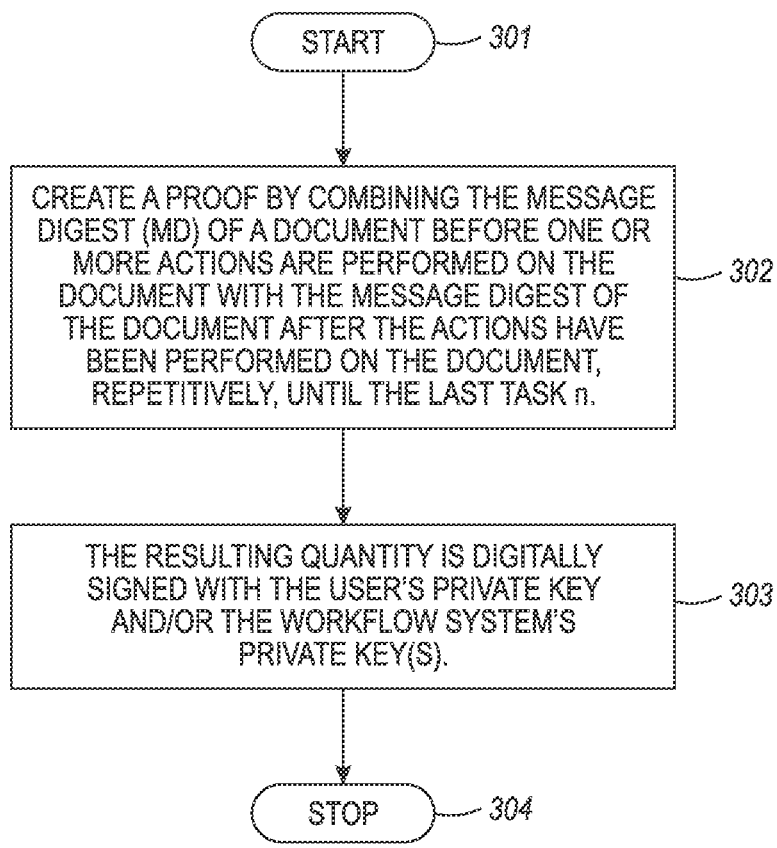
FIG. 3 illustrates an exemplary method of generating a proof.

As stated earlier, it is helpful to provide some measure of security with respect to a document that undergoes various tasks from various people over time. In accordance with the exemplary embodiments described herein the actions (or tasks) (1 to n) performed by each person or employee on each document (1 to m) at a certain stage in the workflow may be recorded within the document as a proof. With reference to FIG. 3, at a high level, the process starts (301), and a proof may then be created by combining the message digest (MD) of a document before one or more actions are performed on the document (or a set of documents such as a document set that includes one or more documents) with the message digest of the document after the actions have been performed on the document, repetitively, until the last task n (302). It is to be understood that the process of combining the two message digests could be accomplished using various means, including, but not limited to, concatenation, simple arithmetic, and/or logical operators. The resulting quantity may then be digitally signed with the user's private key and/or the workflow system's private key(s) (303), whereupon the process may be ended (304).

Figure 4:
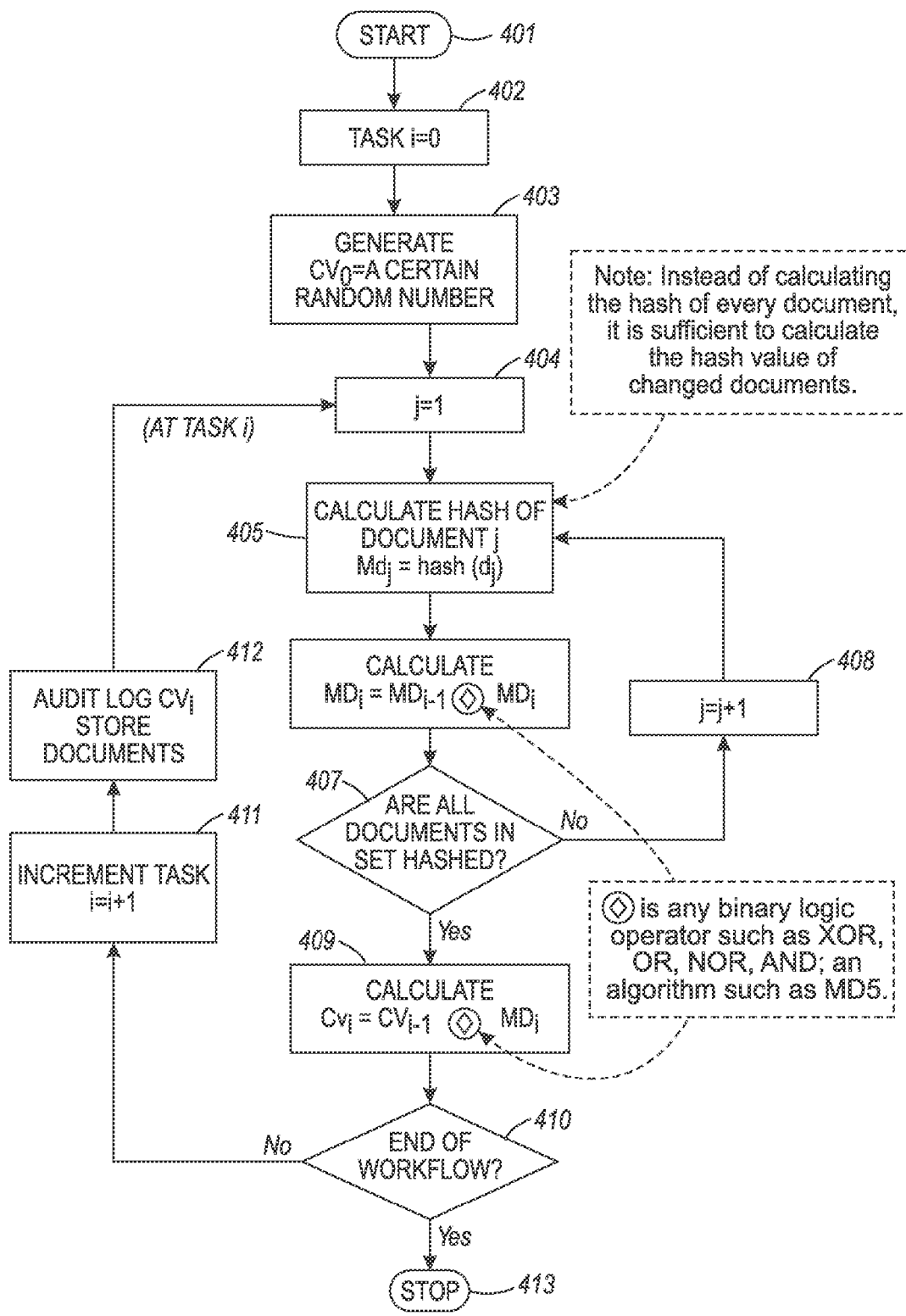
FIG. 4 illustrates how a proof may be generated in greater detail.

FIG. 4 shows a flowchart of an exemplary method of creating chained values in greater detail. Once the process begins for a given task (401), task i is set to 0, where i represents a given task (402). Next, a chained value (CV) is generated (403). The initial chained value, $CV_0$, is a random number. Generally, the random number is a 32-bit, 48-bit, 56-bit, 64-bit, or 128 bit string of 0 s and 1 s. The initial chained value depends at least upon the strength of the message digest (i.e., whether it is based on a one-way hash function, a cryptographic hash function, or a secure hash algorithm) and what the one-way hash function's algorithm gives as an output.

As used herein, a hash, also called a digest, is a unique string of data. A hash is created when a collection of information that someone wants to protect is run through a hash function. The process of creating a hash is called hashing. The resulting hash is unique to the original message and therefore can be used as a fingerprint of that data.

Since a hash creates an identifiable signature of data it can be used to determine whether a set of data has been changed; in other words it is possible to verify the integrity of data. For example, to make sure that financial documents that have been stored have not been tampered with, it is possible to create a hash of the known correct data. Now, whenever a check of the data is needed, the data is hashed again and the two hashes should match if the most current data has not been changed.

Hashes are also called one-way hashes because once they are created they cannot be reversed. This means that a hash cannot be deciphered to determine the contents of the original message. Therefore, hashes can only be used to compare data.

Hashes are created with Hash functions, which are cryptographic algorithms. An algorithm that is considered secure should not create collisions meaning two different sets of data creating the same hash value. In addition, a secure hash algorithm should create hashes that are the same length no matter the size of data being hashed. One of the advantages of a fixed length hash is that other programs can use it easily since it is consistent.

Thus, a one-way hash function is an algorithm that turns messages or text into a fixed string of digits, usually for security or data management purposes. The "one way" means that it is nearly impossible to derive the original text from the string. A one-way hash function is used to create digital signatures, which in turn identify and authenticate the sender and message of a digitally distributed message. A "message digest" is the representation of text in the form of a single string of bits, created using a one-way hash function. Encrypting a message digest with a private key creates a digital signature, which is an electronic means of authentication.

As used herein, a cryptographic hash function refers to a hash function, that is, an algorithm that takes an arbitrary block of data and returns a fixed-size bit string, the (cryptographic) hash value, such that an (accidental or intentional) change to the data will (with very high probability) change the hash value. The data to be encoded is often called the "message," and the hash value is sometimes called the "message digest" or simply the digest. Some of the standard algorithms include MD5, RC4, SHA, SHA-1, SHA-256, etc. There are public domain implementations (available in source code or as binary libraries) of the one-way hash functions written in C, Java, C++, C#, Ruby or PHP. A one-way hash function (e.g., a message digest or secure hash algorithm) generally takes a piece of data and transforms (or maps) it into a fixed-bit string. Although pieces of long data are broken into manageable chunks of data and taken one at a time, ultimately the entire data is converted into this fixed-bit string. For instance, the one-way hash function called MD5 gives as its output a 128-bit string.

If, for example, $CV_0$ uses a 128-bit string of 0 s and 1 s, then every value $CV_1$ to $CV_n$ would be a 128-bit string.

Returning now to FIG. 4, once the certain random number $CV_0$ is generated, j is set to 1 (404), where j represents each document within each task. Thus, "j=1" refers to the first document with a task. The hash of document j is then calculated (405). As shown in the figure, $MD_j$=hash($d_j$), where MD refers to the message digest of a document.

The cumulative message digest (MD) of documents in the set up to document j is then calculated (406) (e.g., $MD_j$=$MD_{j-1}$ ◇ $MD_j$, where "◇" is any binary logic operator, such as XOR, OR, NOR, AND; or an algorithm such as MD5. Further, the exemplary embodiment makes use of standard algorithms for creating a one-way hash of the input data.

Next, a determination as to whether all of the documents in the set are hashed (407). If not, then j is incremented by 1 (408) (e.g., j=j+1), and the calculation of the hash of the next document is made (405).

If, however, all of the documents in the set have been hashed, then the chained value for the given task ($CV_i$) is calculated (409). As shown in the figure, $CV_i$=$C_{i-1}$ ◇ $MD_j$. That is, a proof may be created by combining the message digest of the document before one or more actions are performed on the document (or a set of documents such as a document set that includes one or more documents) with the message digest of the document after the last action (in the current workflow task) is performed by a user in the workflow. This quantity may be digitally signed (either by the user's private key or the system's private key or both). The message digest of the document before one or more actions are performed is called $CV_k$ for the $k^{th}$ step or task in the workflow.

It is combined with the message digest of the current task, which may have one or more actions—all these actions can be said to comprise one action for simplicity. For example: a health care provider such as a physician assistant could enter a particular patient vitals—click the submit button, look at patient's current prescription, then enter what the patient is really consuming i.e., whether the patient is following the prescription, enter those details in another web page or form—click the submit button, etc. Each of the click submissions is an action. All the actions can be said as comprising one task performed by a health care provider for a patient and all the data generated for these actions could be combined and message digested/hashed. In another embodiment, each of the actions could be treated as one single task in the workflow.

Next, a determination is made as to whether the end of the workflow has been reached (410). If the end of the workflow has not been reached, then the task is incremented (411) (e.g., i=i+1). Optionally, an audit log for $CV_i$ may be created, and the documents and other related data may be stored in the database 160 (412).

As used herein, an audit log (or audit trail) refers to a security-relevant chronological record, set of records, or destination and source of records that provide documentary evidence of the sequence of activities that have affected at any time a specific operation, procedure, or event. Audit records typically result from activities such as financial transactions, scientific research and health care data transactions, or communications by individual people, systems, accounts, or other entities. The process that creates an audit log is typically required to run in a privileged mode so it can access and supervise all actions from all users; a normal user should not be allowed to stop and/or change it.

Returning now to FIG. 4, once again, j is set to 1 (404). Steps 405 to 408 are repeated for all the documents in the set for the next task in the workflow. It should be noted that instead of calculating the hash of every document, alternatively, the hash value of only changed documents may be calculated. The chained value for this next task is calculated in step 409. If the end of the workflow has been reached, then the process is stopped (413).

Figure 5:
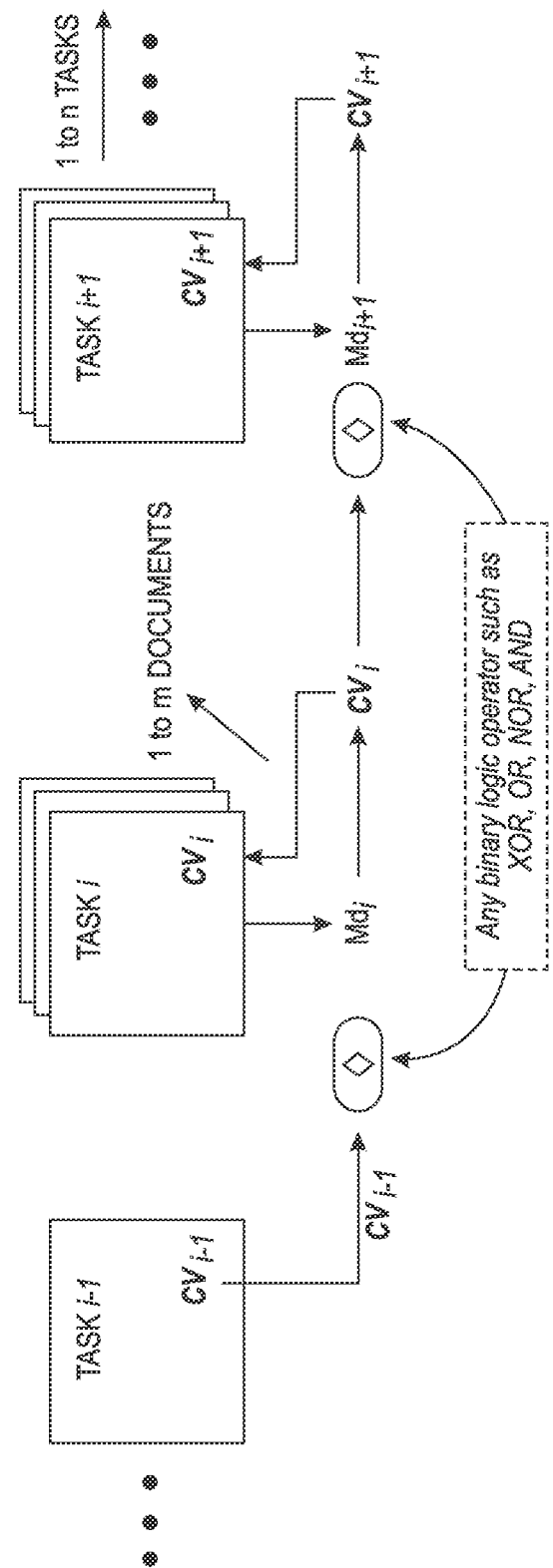
FIG. 5 illustrates in schematic form the creation of chained values.

FIG. 5 illustrates in schematic form the creation of chained values (e.g., $CV_{i-1}$, $CV_i$, $CV_{i+1}$, and so on) for a number (n) of tasks (e.g., task i−1, task i, task i+1, and so on) in schematic form. Each task includes a number (m) of documents. Thus, in essence the proof is a chained set of values, i.e., $CV_k$ (where k=1 to n)—for tasks 1 to n.

The exemplary method offers a tamper-proof verification of actions performed on the object at each task. Note that an object such as a document is envisioned to traverse through each of the tasks where a process or a user (e.g., an employee) performs one or more actions. This proof enables a process or person at task (i+1) to cryptographically prove through one-way hash functions, such as MD5 or SHA-1, that previous tasks have been completed before the task (i+1) was performed. It is noted that the MD5 Message-Digest Algorithm is a widely used cryptographic hash function that produces a 128-bit (16-byte) hash value and that SHA-1 is a cryptographic hash function, which produces a 160-bit message digest based on principles similar to those used in the design of the MD4 and MD5 message digest algorithms.

The proof could be performed by workflow software that also displays the users or processes who performed the task (deciphering the digital signatures on the chained values). If someone tampers (e.g., deletes an object within a document, deletes a document within the set of documents, and/or adds or modifies objects within a document) with the object and performs tasks previously completed, then the message digest of the document would be different from the one that was performed when the document was at the same task in the workflow earlier, since the document would have been altered significantly and the propagated chained values would be incongruent with the newly created chained value. This embodiment is particularly useful when someone deletes a document along with its stored message digest as the deleted document is inextricably linked to other documents using a chained value. Thus, this could also be used for auditing a workflow by verifying it against workflow tampering. In addition, a timestamp may be included in the digital signatures, which would be used to detect the date and time of any tampering (if the same or another authenticated employee tampered with the document at a later date).

Embodiments may also include non-transitory computer-readable medium for carrying or having computer-executable instructions or data structures stored thereon. Such computer-readable medium can be any available medium that can be accessed by a general purpose or special purpose computer. By way of example, and not limitation, such computer-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable medium.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. The instructions for carrying out the functionality of the disclosed embodiments may be stored on such a computer-readable medium.

The instructions from a computer-readable medium may be used by an electronic device, such as the system 110, to cause the functionality of the embodiments to occur. These instructions may be loaded into a memory of the system 110 to be executed by a processor as needed.

Note that it is not necessary for an audit log to be kept on a central server. Moreover, when a document traverses between organizations, it may be difficult to have a central server between the two organizations unless prior arrangements have been made. This is even more difficult when the object traverses between paper and digital domain, and when it traverses into and out of the hands of a non-user of the workflow. In a health care system, medical records typically traverse the electronic and paper domains several times. For example, a patient's initial complaint along with an appointment setup may be a recorded telephonic voice message. The patient's initial visit to a doctor may trigger a diagnostic task with a visit to the lab for a blood test. This is generally a paper document that lists what kinds of tests should be performed on the blood sample taken from the patient. Test results can be sent electronically or via paper to the doctor's office. A doctor's prescription is taken to a pharmacy by the patient in paper form or it may be sent electronically. The pharmacist examines the prescription for availability of generic drugs, sends a request to a Health Savings Account maintained by a bank and to the insurance company for necessary payment. The pharmacist-assistant fills in the prescription and dispenses the drug. In this scenario, the document moves between paper and electronic domains several times and crosses many organizations before being archived. At each stage, access rights are verified before any operation is performed. The digital signatures are used to provide non-repudiation of the actions having been performed on the object by a user, when the user signs off (completes) each task. Audit logs can of course be maintained as a secondary proof.

Some of the benefits of the exemplary method may include, for example:

A surgeon could not hide having operated on the wrong leg of a patient by changing the health records of the patient.

A mortgage lender could not deny having used a different interest rate from the original agreed upon value by tampering with the documents.

An audit log itself could not be tampered with by officers on duty at a plant, such as a chemical, power, nuclear, or manufacturing plan, after a deadly accident occurs.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of providing a non-repudiable proof for a workflow, the method comprising:
    creating a proof for the workflow by combining a message digest of a document in a set of documents before one or more actions are performed on the document with a message digest of the document after one or more actions have been performed on the document repetitively until a last action has been performed on the document in the workflow to generate a resulting quantity, wherein a workflow comprises a sequence of tasks and the actions that have been performed on the set of documents and resulted in one or more changes to the documents, wherein creating a proof comprises:
    generating an initial chained value for the document via a hardware processor in a document processing system, wherein the initial chained value comprises a random number;
    calculating a hash of the document via the processor;
    calculating a chained value for a first task in the workflow using the initial chained value and the hash of the document via the processor;
    generating subsequent chained values by combining the message digest of the document or document set with the message digest of the previous document or document set; and wherein the method further comprises:
    creating a digital signature by digitally signing the resulting quantity with a first private key from a user and a second private key from a workflow system, wherein the digital signature includes a timestamp of when the digital signature was created.

2. The method of claim 1, further comprising:
calculating the message digest of the document through a one-way hash function.

3. The method of claim 1, further comprising:
combining the message digests via concatenation, simple arithmetic, and/or binary logical operators wherein the binary logic operator comprises one of XOR, OR, NOR, NAND, or AND operators.

4. The method of claim 1, further comprising:
storing the resulting quantity in an audit log.

5. The method of claim 4, wherein the audit log is stored on a central server.

6. The method of claim 4, wherein the audit log is stored on a plurality of distributed servers.

7. A document processing system for providing a non-repudiable proof for a workflow, the system comprising:
one or more hardware processors and a memory storing instructions that, when executed, cause the document processing system to:
create a proof for the workflow by combining a message digest of a document in a set of documents before one or more actions are performed on the document with a message digest of the document after one or more actions have been performed on the document repetitively until a last action has been performed on the document in the workflow to generate a resulting quantity, wherein a workflow comprises a sequence of tasks and the actions that have been performed on the set of documents resulted in one or more changes to the documents, wherein the one or more processors and the memory store further instructions that, when executed, cause the document processing system to create a proof by:
generating an initial chained value for the document via the processor in the document processing system, wherein the initial chained value comprises a random number;
calculating a hash of the document via the processor;
calculating a chained value for a first task in the workflow using the initial chained value and the hash of the document via the processor;
generating subsequent chained values by combining the message digest of the document or document set with the message digest of the previous document or document set; and wherein the one or more processors and the memory store further instructions that, when executed, cause the document processing system to:
create a digital signature by digitally signing the resulting quantity with a first private key from a user and a second private key from a workflow system, wherein the digital signature includes a timestamp of when the digital signature was created.

8. The system of claim 7, wherein:
the memory stores further instructions to combine the message digests via concatenation, simple arithmetic, and/or binary logical operators wherein the binary logic operator comprises one of XOR, OR, NOR, NAND, AND operators.

9. The system of claim 7, wherein the memory stores further instructions to:
calculate the message digest of the document through a one way hash function, wherein the one way has function comprises MD5, SHA-1, or SHA-256.

10. The system of claim 7, further comprising:
a database configured to store an audit log that includes the resulting quantity.

11. A non-transitory computer-usable data carrier storing instructions that, when executed by a computer, cause the computer to perform a method of providing a non-repudiable proof for a workflow, the method comprising:
creating a proof for the workflow by combining a message digest of a document in a set of documents before one or more actions are performed on the document with a message digest of the document after one or more actions have been performed on the document repetitively until a last action has been performed on the document in the workflow to generate a resulting quantity, wherein the actions that have been performed on the set of documents resulted in one or more changes to the documents, wherein the creating a proof comprises:
generating an initial chained value for the document via a hardware processor in a document processing system, wherein the initial chained value comprises a random number;
calculating a hash of the document via the processor;
calculating a chained value for a first task in the workflow using the initial chained value and the hash of the document via the processor;
generating subsequent chained values by combining the message digest of the document or document set with the message digest of the previous document or document set; and wherein the method further comprises:
creating a digital signature by digitally signing the resulting quantity with a first private key from a user and a second private key from a workflow system, wherein the digital signature includes a timestamp of when the digital signature was created.

12. The non-transitory computer-usable data carrier of claim 11, wherein the method further comprises:
combining the message digests via concatenation, simple arithmetic, and/or logical operators.

13. The non-transitory computer-usable data carrier of claim 11, wherein the method further comprises:
calculating the message digest of the document through a cryptographic one-way hash function.

14. The non-transitory computer-usable data carrier of claim 11, wherein the method further comprises:
storing the resulting quantity in an audit log.

* * * * *